E. H. SPENCER.
VALVE.
APPLICATION FILED MAR. 15, 1920.
1,383,871.
Patented July 5, 1921.
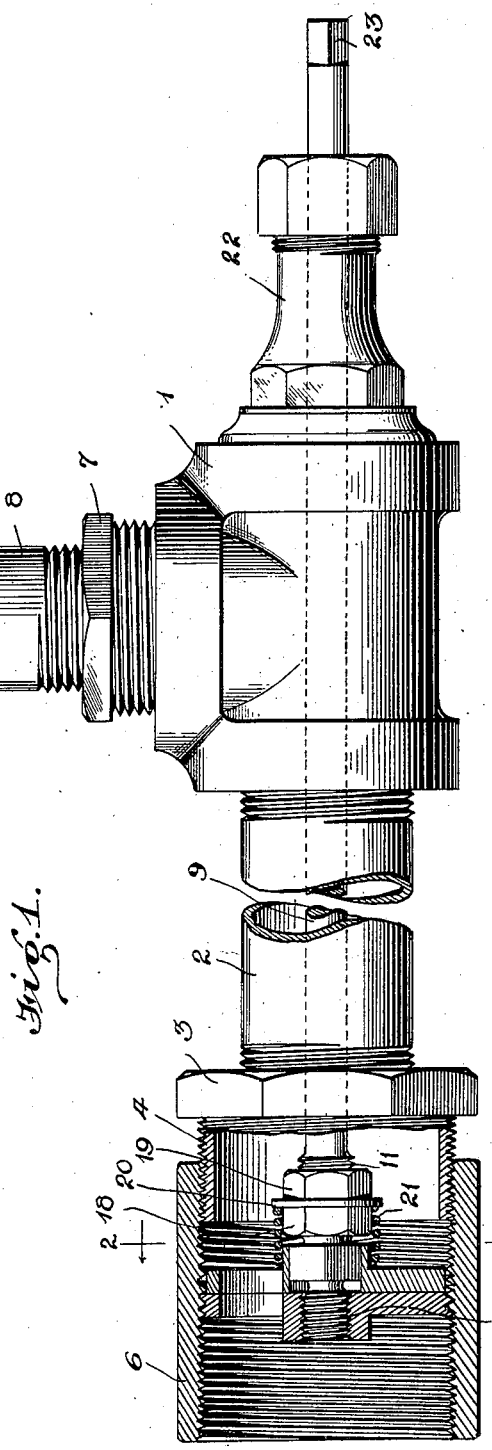
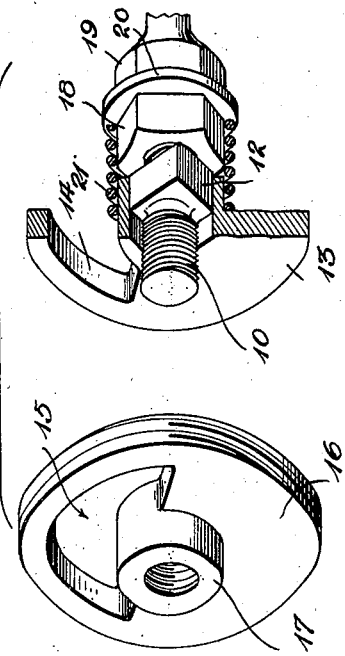
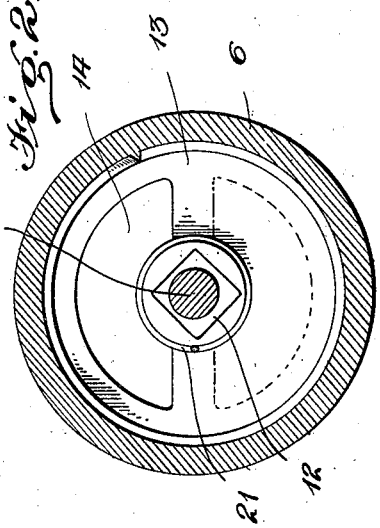
Inventor
Elmer H. Spencer,
By Mason Fenwick&Lawrence.
Attorneys.

UNITED STATES PATENT OFFICE.

ELMER H. SPENCER, OF NEDERLAND, TEXAS, ASSIGNOR OF ONE-FOURTH TO A. C. BLOCK, OF PORT NECHES, TEXAS, AND ONE-FOURTH TO CROOK, LORD & LAWHON, A LAW FIRM COMPOSED OF W. M. CROOK, C. A. LORD, AND I. W. LAWHON, OF BEAUMONT, TEXAS.

VALVE.

1,383,871.          Specification of Letters Patent.          Patented July 5, 1921.

Application filed March 15, 1920. Serial No. 365,919.

*To all whom it may concern:*

Be it known that I, ELMER H. SPENCER, citizen of the United States, residing at Nederland, in the county of Jefferson and State of Texas, have invented certain new and useful Improvements in Valves; and I do hereby declare the following to be a full, clear, and exact description of the invention, such as will enable others skilled in the art to which it appertains to make and use the same.

This invention relates to new and useful improvements in valves in which the valve body has a sliding movement on the valve seat in opening and closing, and more particularly to that type known as disk valves. The main object of this invention is to provide a valve of this type which is particularly adapted to be used upon the interior of a tank, vat or similar receptacle containing liquid.

Another object of this invention is the provision of a valve wherein the surfaces which effect the closing of the valve are entirely removed from the substance passing through the valve and thus eliminates serious difficulties which have been found in the old type of valve where a portion of the surface necessary to close the old type of valves is exposed to the moving substance and in such exposure become worn and leaky.

Another object of the present invention is the provision of a disk type valve which includes means for retaining the valve members in close contact with one another so as to permit no space between the two members and thus eliminate the gathering of sediment or foreign substances between the two members.

A further object of the invention is the provision of a valve of this type wherein the valve itself may be arranged within a tank or still and submerged in the liquid contained within said tank or still and thus eliminate any danger of the same becoming broken or damaged through accident, which generally occurs with the old type of valve arranged upon the exterior of a tank or still.

With the above and other objects in view, the invention consists in the construction, the combination and arrangement of parts hereinafter more fully set forth, pointed out in the claims and shown in the accompanying drawings in which, Figure 1 is a side elevation of my improved valve, parts thereof being broken away and illustrated in section, Fig. 2 is a transverse sectional view taken on the line 2—2 of Fig. 1, and Fig. 3 is a detailed perspective view of the valve members in disassembled relation, parts thereof being broken away and illustrated in section.

In the drawings accompanying this description, I have illustrated the valve as attached to a tee coupling, generally indicated by the numeral 1, having extended from one end thereof the outlet pipe 2 which is provided with a reducer 3. The body 4 of the reducer 3 is threaded and connected therewith is a pipe coupling or sleeve 6 which forms the valve chamber. The tee coupling 1 is provided as herein illustrated with a reducing plug 7 and connected to this reducing plug is a draw-off pipe 8 through which the liquid contained within the tank, to which my improved valve is applied, may be dispensed.

The valve proper includes the stem 9, the inner end of which is provided preferably with two enlarged threaded portions generally indicated by the numerals 10 and 11; and arranged between these threaded portions is a rectangular shoulder 12 upon which is mounted the valve body or disk 13. This valve disk 13 is preferably of cylindrical formation, provided upon one side of its center with an arcuate port or opening 14 which is adapted to correspond with a similar port or opening 15 formed in the valve seat 16. This valve disk 13 is centrally provided with a substantially rectangular sleeve adapted to be engaged over the shoulder 14 whereby the disk is rotated through the turning movement of the valve stem 9 and caused to slide, rotatably, upon the seat to closed or opened position.

The valve seat 16 which is substantially cylindrical in form is provided upon its exterior face with screw threads adapted to conform with the screw threads upon the interior of the coupling constituting the valve chamber 6 and is further provided at the central portion with an interiorly threaded sleeve 17 which is adapted for engagement with the threaded portions 10 or 11 on the inner end of the valve stem.

Mounted upon one of the threaded portions of the valve stem 9 are the locking nuts 18 and 19 having arranged therebetween a washer 20 as illustrated in Fig. 1. It will be noted that the lock nut 18 is of substantially the size of the sleeve formed upon the central portion of the valve disk 14 and mounted upon this sleeve and the lock nut 18 is a coil spring 21, one end of which bears against the washer 20, while the other end thereof bears against the valve disk 13 so as to normally retain the valve disk in close contact with the valve seat 16.

The outer end of the valve stem 9 extends through a guide sleeve or standard bonnet 22 and at the outer end of the valve stem, I provide a substantially rectangular portion 23 adapted to accommodate a handle (not shown). It will be noted that in Fig. 1, the valve member is shown in an open position so that the liquid can readily pass through the openings 14 and 15 and thence outwardly through the outlet pipe 2 where it will be directed, by means of the tee 1 into the outlet pipe 8. It will be noted from this, that the parts of the valve which effect its closing are not exposed to the motion of the liquid and in order to close the valve, it is simply necessary to give the stem 9 a half turn so that the solid portion of the valve body or disk 13 is moved into a closing position over the opening 15 in the valve seat 16. It will also be noted that the coil spring 21 will normally retain the valve disk 13 in close contact with the valve seat 16 so as to prevent any sediment or foreign substances from becoming engaged between the valve members.

It is to be understood that the two threaded portions 10 and 11 on the valve stem 9 permit the valve disk 13 and valve seat 16 to be readily reversed in their positions, that is, the valve seat 16 can be engaged by the threaded portion 11 and the lock nuts 18 and 19 engaged upon the threaded portion 10, thus reversing the position of the valve disk so that the latter is arranged upon the inner face of the valve seat; also, that the valve seat 16 may be reversed if required. It may be stated here that when the valve disk 13 is arranged upon the inner face of the valve seat 16, the coil spring 21 can be done away with if desired, as the pressure of the liquid contained within the tank to which the valve is applied will be sufficient to retain the valve disk 13 in close contact with the seat 16. It will also be stated that the contacting faces of the disk 13 and valve seat 16 may be formed inclined at such an extent that when they are brought to a closed position, they will provide a secure tight-fitting joint.

From the above description, taken in connection with the accompanying drawings, it will be readily apparent that I have provided an extremely simple valve which is to be located upon the interior of tanks, stills or the like and submerged within the liquid contents of the tank and thus doing away with the old type of valve which is generally arranged upon the exterior of the tank.

While I have shown and described this valve as particularly adapted for use upon the interior of tanks, vats and the like, it should be fully understood that the same may be used equally as well upon the exterior of various types of receptacles. It will also be apparent that while I have illustrated the use of right and left hand threads in various places upon the drawings, it is to be understood that these may be converted to suit the convenience to which the valve is to be applied.

What I claim is:

1. A valve of the class described comprising a casing, a valve seat therein having a port and a hole for a valve stem, a valve stem rotatable in said hole, a valve body connected to said stem, and an adjustable abutment adapted to be secured to the stem on either side of said valve body.

2. In a device of the class described, a casing, a valve seat therein having a port, a valve body having a sliding movement on said seat to open and close said port, said valve body being constantly pressed in contact with said seat, and means adapted to increase pressure upon said valve body during its movement to closed position and relax pressure thereon during its movement to open position.

3. In a device of the class described, a casing, a valve seat therein having a port, a valve body adapted to open and close said port by a rotary sliding movement thereon, said valve body being constantly pressed in contact with said seat, a valve stem adapted to rotate said valve body, and means actuated by the valve stem to increase the pressure upon the valve during its movement toward the closing position and to relax said pressure during movement thereof to open position.

4. In a device of the class described, a casing, a valve seat therein having a port, a valve body adapted to open and close said port by rotary sliding movement thereon, a valve stem having a combined rotary and longitudinal movement, said stem being connected to said valve body so as to compel the latter to rotate with the stem but permit a relative longitudinal movement of said stem and valve body, and means actuated by the valve stem in its longitudinal movement to increase the pressure of the valve body against the seat during the closing movement of said valve and to relax said pressure during the opening movement thereof.

5. In a device of the class described, a casing, a valve seat thereon having a port, a valve body adapted to open and close said port by a rotary sliding movement thereon, a valve stem threaded to said seat, said stem being connected to said valve body so as to compel the latter to rotate with the stem but permit a relative longitudinal movement of said stem and valve body, and means on the stem adapted to increase pressure upon the valve during the closing movement of the latter and to relax said pressure during the opening movement thereof.

6. In a device of the class described, a casing, a valve seat therein having a port, a valve body adapted to open and close said port by a rotary sliding movement thereon, a valve stem threaded to said seat, said stem being connected to said valve body so as to compel the latter to rotate with said stem but permit relative longitudinal movement, and a spring reacting between said stem and valve body so as to press the latter to its seat, and so disposed as to increase its pressure upon said valve body in the closing movement thereof and relax its pressure during the opening movement thereof.

7. In a device of the class described, a valve casing, a detachable and reversible valve seat therein, said valve seat having a port and a hole for a valve stem, a valve stem having enlarged portions of similar size either of which is adapted to rotate in the hole in said seat, a valve body adapted to engage with said stem between said enlarged portions so that the said valve body may be rotated by said stem, and an abutment member adapted to be engaged with either of said enlarged portions of the stem.

8. In a device of the class described, a valve casing, a detachable and reversible valve seat therein, said valve seat having a port, and a threaded hole for a valve stem, a valve stem having enlarged threaded portions adapted to engage the threaded hole in said seat, a valve body having a rotary sliding engagement with said seat, said valve body being adapted to engage said stem between said threaded portions, so that said valve body may be rotated by said stem and move longitudinally with respect thereto, a threaded abutment member adapted to be engaged with the threaded portion of said stem on either side of said valve.

9. A valve comprising a casing consisting of an interiorly threaded member constituting a valve chamber, piping threaded to said threaded member, a valve seat threaded into said member, a valve stem having fluid tight bearings in said piping, and a valve body operated by said stem.

10. The combination of a valve casing having a valve seat, with a valve body and stem, said casing comprising the following standard pipe fittings: a threaded coupling, a reducer, a pipe section threaded to said reducer, a tee threaded to said pipe section, a valve bonnet connected to said tee; said valve seat being threaded into said coupling and said stem passing through said bonnet.

In testimony whereof I affix my signature.

ELMER H. SPENCER.